(12) United States Patent
Dutta et al.

(10) Patent No.: US 11,210,130 B2
(45) Date of Patent: Dec. 28, 2021

(54) ADAPTIVE WRITE ACKNOWLEDGMENT FOR STORAGE DEVICES

(71) Applicant: Intel Corporation, Santa Clara, CA (US)

(72) Inventors: Bishwajit Dutta, Hillsboro, OR (US); Sanjeev N. Trika, Portland, OR (US); Anand S. Ramalingam, Portland, OR (US); Pallav H. Gala, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/855,139

(22) Filed: Apr. 22, 2020

(65) Prior Publication Data

US 2020/0249980 A1     Aug. 6, 2020

(51) Int. Cl.
| | |
|---|---|
| *G06F 9/46* | (2006.01) |
| *G06F 3/06* | (2006.01) |
| *G06F 9/54* | (2006.01) |
| *G06F 9/48* | (2006.01) |

(52) U.S. Cl.
CPC ............ *G06F 9/467* (2013.01); *G06F 3/0604* (2013.01); *G06F 3/0659* (2013.01); *G06F 3/0673* (2013.01); *G06F 9/4881* (2013.01); *G06F 9/544* (2013.01)

(58) Field of Classification Search
CPC ............................... G06F 3/0673; G06F 9/467
See application file for complete search history.

(56) References Cited

U.S. PATENT DOCUMENTS

2008/0016254 A1*  1/2008  Kruger ............... G06F 13/1657
                                                           709/251

* cited by examiner

*Primary Examiner* — David E Martinez
(74) *Attorney, Agent, or Firm* — Jaffery Watson Mendonsa & Hamilton LLP

(57) ABSTRACT

Examples include techniques for managing high priority (HP) and low priority (LP) write transaction requests by a storage device. An embodiment includes receiving, at a storage controller for a storage device, a write transaction request from a requestor to write data to one or more memory devices in the storage device. When the write transaction request is for a high priority (HP) write, coalescing the write data into a transaction buffer in a memory of the storage device, sending an acknowledgment for the write transaction request to the requestor, and writing the write data into the one or more memory devices. When the write transaction request is for a low priority (LP) write, writing the write data into the one or more memory devices, and then sending an acknowledgment for the write transaction request to the requestor.

20 Claims, 10 Drawing Sheets

ADAPTIVE WRITE ACKNOWLEDGMENT FOR STORAGE DEVICES

TECHNICAL FIELD

Examples described herein are generally related to techniques for write transactions to a storage device.

BACKGROUND

In some examples, file systems, databases, or disk caches may be associated with different types of applications or an operating system (OS) in a computing system of a data center. For these examples, an application or OS may issue a transaction requests such as one or more read or write operations to a non-volatile memory (e.g., a read or a write transaction) included in a storage device.

Typical datacenter workloads consist of a mix of reads and writes in about 70:30 ratio. The writes may include: a) high frequency and relatively large low priority (LP) writes and b) lower-frequency and small high priority (HP) metadata writes. HP writes are either tagged by the host software applications or detected by the host firmware as the data chunk size is usually <=64 kilobytes (KB). Additionally, multiple applications/threads trigger host writes, and their operation depends on back pressure, e.g., many applications wait for pending writes to complete (back pressure to reduce) before issuing new writes.

NAND-based solid-state drives (SSDs) must send timely completion status acknowledgments (ACKs) for input/output (I/O) transaction requests and admin commands to the host. In case of host writes, they can either be Immediate Write ACK (IWA) or Delayed Write ACK (DWA). With IWA, a host write is ACKed as soon as the write data is direct memory access (DMA) transferred from the host memory to an SSD transaction buffer. The data is made non-volatile in the background. On the other hand, with DWA, host writes are ACKed only after the host data is programmed successfully to NAND storage media in the SSD.

DETAILED DESCRIPTION

SSDs typically support either IWA or DWA, and each mechanism has disadvantages. For SSDs with IWA, the SSD transaction buffer free space may not be available for HP writes, and as such, the HP writes can get delayed. There is no host control over memory die use for write operations, causing higher read tail latencies (thereby impacting read Quality of Service—rQoS) due to reads colliding with ongoing writes. Finally, the rQoS impact can be as high as 15-20 milliseconds (ms) for 99.999% of reads. For SSDs with DWA, DWA impacts write QoS, particularly at low queue depth (QD), as writes are not immediately acknowledged. DWA can increase write-amplification for low QD unaligned I/O transactions. In real-world scenarios, the write data chunk size can be random, but NAND memory can be programmed only at a fixed granularity. Also, host writes need to be acknowledged before a specified timeout. This leads to padding of the host data instead of coalescing incoming writes (e.g., 4 KB QD1 random writes on quad level CELL (QLC) NAND will need 188 KB padding to make the write data appropriate for NAND program granularity of 192 KB).

Embodiments of the present invention overcome the above-mentioned problems by adaptive acknowledging of host writes, called Adaptive Write Acknowledgement (AWA) herein. The AWA approach has three components: 1) HP writes are immediately acknowledged, thus improving the QoS for HP writes. This is achieved by reserving a portion of the SSD transaction buffer exclusively for HP writes. The HP writes are acknowledged immediately and coalesced in a reserved space in the SSD transaction buffer thus avoiding unnecessary padding; 2) The host is informed of the ideal LP write granularity to minimize padding. LP writes are acknowledged only after writing to NAND, and this provides a mechanism of delivering backpressure on the host write threads and thus avoiding SDD transaction buffer overflow; and 3) The host controls the number of memory dies of memory devices getting programmed at any given time. This approach with DWA allows the indirect control over rQoS by controlling read on write collisions.

Embodiments of the present invention improve rQoS for HP Writes by immediate acknowledging, instead of acknowledging after memory die programming time (which is typically >1 ms). Additionally, padding is avoided, which reduces write amplification. AWA allows control of rQoS by controlling read on write collision probability. If a maximum of X % NAND dies is allowed for program operation, collision probability is only X %. For example, with 10% maximum program dies, a $90^{th}$ percentile rQoS will be 1 ms, as compared to all the writes being delayed by 1 ms when 100% of the NAND dies use is allowed for maximum write bandwidth.

Figure 1:
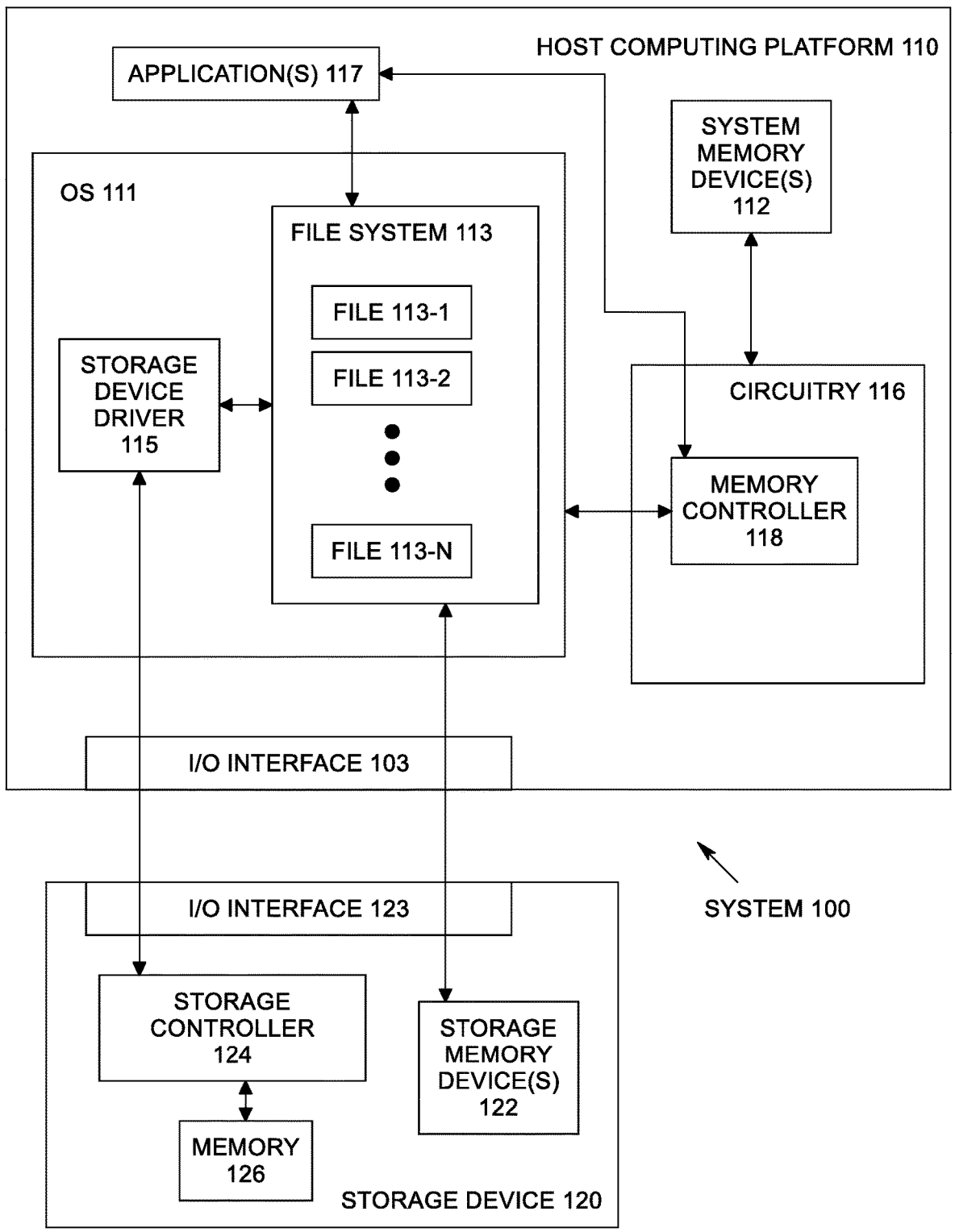
FIG. 1 illustrates an example computing system.

FIG. 1 illustrates an example system 100. In some examples, as shown in FIG. 1, system 100 includes a host computing platform 110 coupled to a storage device 120 through I/O interface 103 and I/O interface 123. Also, as shown in FIG. 1, host computing platform 110 may include an OS 111, one or more system memory device(s) 112, circuitry 116 and one or more application(s) 117. For these examples, circuitry 116 may be capable of executing various functional elements of host computing platform 110 such as OS 111 and application(s) 117 that may be maintained, at least in part, within system memory device(s) 112. Circuitry 116 may include host processing circuitry to include one or more central processing units (CPUs) and associated chipsets and/or controllers.

According to some examples, as shown in FIG. 1, OS 111 may include a file system 113 and a storage device driver 115 and storage device 120 may include a storage controller 124, one or more storage memory device(s) 122 and memory 126. OS 111 may be arranged to implement storage device driver 115 to coordinate at least temporary storage of data for a file from among files 113-1 to 113-n, where "n" is any whole positive integer >1, to storage memory device(s) 122. The data, for example, may have originated from or may be associated with executing at least portions of application(s) 117 and/or OS 111. As described in more detail below, the OS 111 communicates one or more commands and transactions with storage device 120 to read and/or write data to storage device 120. The commands and transactions may be organized and processed by logic and/or features at the storage device 120 to implement transactions to read and/or write the data from/to storage device 120.

In some examples, storage controller 124 may include logic and/or features to receive a write transaction request for a write transaction to storage memory device(s) 122 at storage device 120. For these examples, the write transaction may be initiated by or sourced from an application such as application(s) 117 that utilizes file system 113 to write data to storage device 120 through input/output (I/O) interfaces 103 and 123.

In some examples, memory 126 may include volatile types of memory including, but not limited to, RAM, D-RAM, DDR SDRAM, SRAM, T-RAM or Z-RAM. One example of volatile memory includes DRAM, or some variant such as SDRAM. A memory subsystem as described herein may be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BAND-WIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

However, examples are not limited in this manner, and in some instances, memory 126 may include non-volatile types of memory, whose state is determinate even if power is interrupted to memory 126. In some examples, memory 126 may include non-volatile types of memory that is a block addressable, such as for NAND or NOR technologies. Thus, a memory 126 can also include a future generation of types of non-volatile memory, such as a 3-dimensional cross-point memory (3D XPoint™ commercially available from Intel Corporation), or other byte addressable non-volatile types of memory. According to some examples, the memory 126 may include types of non-volatile memory that includes chalcogenide glass, multi-threshold level NAND flash memory, NOR flash memory, single or multi-level Phase Change Memory (PCM), a resistive memory, nanowire memory, FeTRAM, MRAM that incorporates memristor technology, or STT-MRAM, or a combination of any of the above, or other memory.

In some examples, storage memory device(s) 122 may be a device to store data from write transactions and/or write operations. Storage memory device(s) 122 may include one or more chips or dies having gates that may individually include one or more types of non-volatile memory to include, but not limited to, NAND flash memory, NOR flash memory, 3-D cross-point memory (3D XPoint™), ferroelectric memory, SONOS memory, ferroelectric polymer memory, FeTRAM, FeRAM, ovonic memory, nanowire, EEPROM, phase change memory, memristors or STT-MRAM. For these examples, storage device 120 may be arranged or configured as a solid-state drive (SSD). The data may be read and written in blocks and a mapping or location information for the blocks may be kept in memory 126.

Examples are not limited to storage devices arranged or configured as SSDs, other storage devices such as a hard disk drive (HDD) are contemplated. In these instances, the storage memory device (s) 122 may include one or more platters or rotating disks having a magnet material to store data.

According to some examples, communications between storage device driver 115 and storage controller 124 for data stored in storage memory devices(s) 122 and accessed via files 113-1 to 113-*n* may be routed through I/O interface 103 and I/O interface 123. I/O interfaces 103 and 123 may be arranged as a Serial Advanced Technology Attachment (SATA) interface to couple elements of host computing platform 110 to storage device 120. In another example, I/O interfaces 103 and 123 may be arranged as a Serial Attached Small Computer System Interface (SCSI) (or simply SAS) interface to couple elements of host computing platform 110 to storage device 120. In another example, I/O interfaces 103 and 123 may be arranged as a Peripheral Component Interconnect Express (PCIe) interface to couple elements of host computing platform 110 to storage device 120. In another example, I/O interfaces 103 and 123 may be arranged as a Non-Volatile Memory Express (NVMe) interface to couple elements of host computing platform 110 to storage device 120. For this other example, communication protocols may be utilized to communicate through I/O interfaces 103 and 123 as described in industry standards or specifications (including progenies or variants) such as the Peripheral Component Interconnect (PCI) Express Base Specification, revision 3.1, published in November 2014 ("PCI Express specification" or "PCIe specification") or later revisions, and/or the Non-Volatile Memory Express (NVMe) Specification, revision 1.2, also published in November 2014 ("NVMe specification") or later revisions.

In some examples, system memory device(s) 112 may store information and commands which may be used by circuitry 116 for processing information. Also, as shown in FIG. 1, circuitry 116 may include a memory controller 118. Memory controller 118 may be arranged to control access to data at least temporarily stored at system memory device(s) 112 for eventual storage to storage memory device(s) 122 at storage device 120.

In some examples, storage device driver 115 may include logic and/or features to forward commands associated with one or more write transactions and/or write operations originating from application(s) 117. For example, the storage device driver 115 may forward commands associated with write transactions such that data may be caused to be stored to storage memory device(s) 122 at storage device 120. More specifically, storage device driver 115 can enable communication of the write operations from application(s) 117 at computing platform 110 to controller 124.

System Memory device(s) 112 may include one or more chips or dies having volatile types of memory such RAM, D-RAM, DDR SDRAM, SRAM, T-RAM or Z-RAM. However, examples are not limited in this manner, and in some instances, system memory device(s) 112 may include non-volatile types of memory, including, but not limited to, NAND flash memory, NOR flash memory, 3-D cross-point memory (3D XPoint™), ferroelectric memory, SONOS memory, ferroelectric polymer memory, FeTRAM, FeRAM, ovonic memory, nanowire, EEPROM, phase change memory, memristors or STT-MRAM.

According to some examples, host computing platform 110 may include, but is not limited to, a server, a server array or server farm, a web server, a network server, an Internet server, a work station, a mini-computer, a main frame computer, a supercomputer, a network appliance, a web appliance, a distributed computing system, a personal computer, a tablet computer, a smart phone, multiprocessor systems, processor-based systems, or combination thereof.

Figure 2:
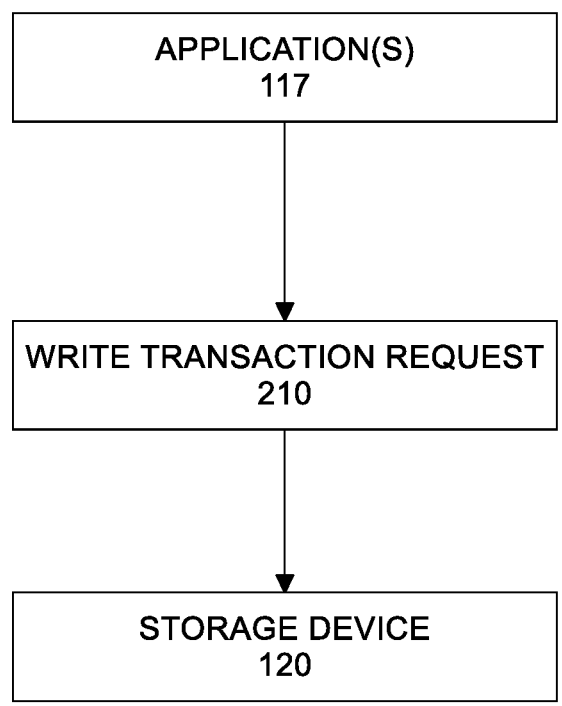
FIG. 2 illustrates a logic flow according to some embodiments.

FIG. 2 illustrates an example process. In some examples, process 200 as shown in FIG. 2 depicts a process to implement a write transaction. For these examples, this process may be implemented by or use components or elements of system 100 shown in FIG. 1 such as application(s) 117, OS 111, storage device 120, storage controller 124, memory 126, and/or storage memory device(s) 122. However, this process is not limited to being implemented by or use only these component or elements of system 100.

In embodiments of the present invention, a storage device 120 having multiple storage memory devices 122 (e.g., multiple media) provides a write transaction that writes to media in the storage device and provides acks according to AWA as described herein. In some examples, at 210, a write transaction request 210 may be sent or submitted by application(s) 117 via OS 111 and/or storage device driver 115 for a write transaction to be handled by storage device 120.

Figure 3:
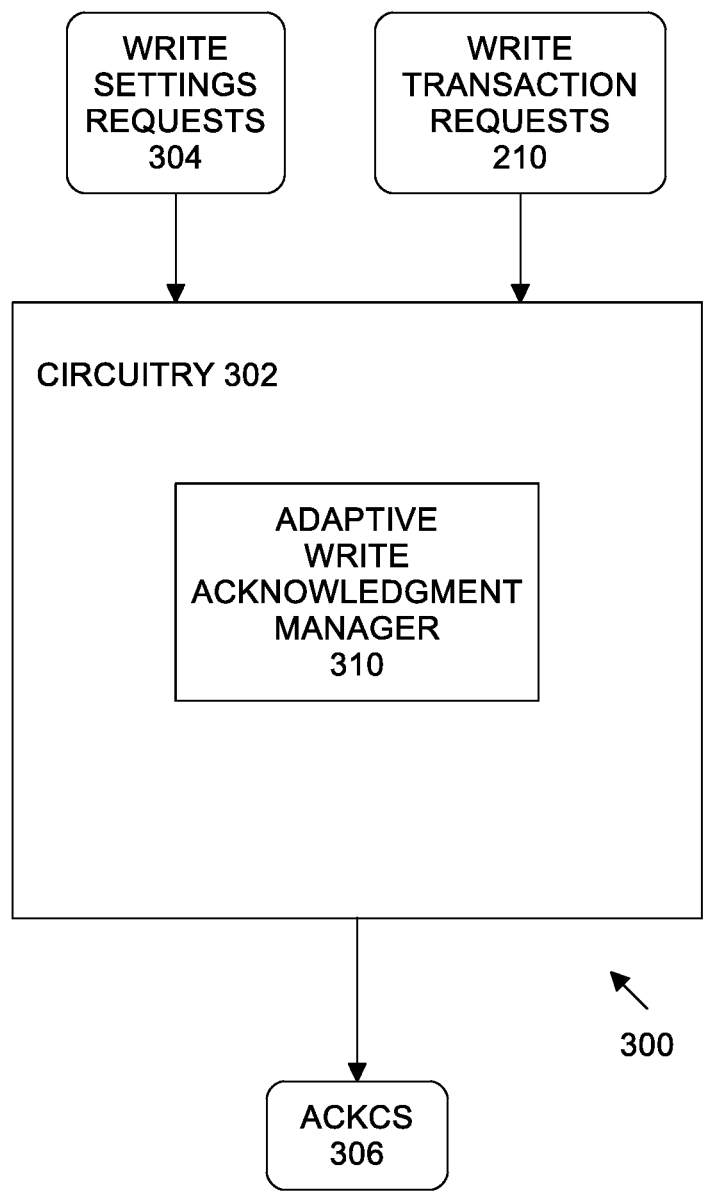
FIG. 3 illustrates a block diagram for an apparatus according to some embodiments.

FIG. 3 illustrates an example block diagram for an apparatus 300. Although apparatus 300 shown in FIG. 3 has a limited number of elements in a certain topology, it may be appreciated that the apparatus 300 may include more or less elements in alternate topologies as desired for a given implementation.

The apparatus 300 may be supported by circuitry 302 and apparatus 300 may be a storage controller maintained at a storage device such as storage controller 124 for storage device 120 of system 100 shown in FIG. 1. The storage device may be coupled to a host computing platform or device similar to host computing platform 110 also shown in FIG. 1. Also, as mentioned above, the storage device may include one or more memory devices or dies to store data associated with write transaction requests placed by one or more applications hosted by the host computing platform. Circuitry 302 may be arranged to execute one or more software or firmware implemented components or modules 310 (e.g., implemented, at least in part, by a storage controller of a storage device). Also, these "components" may be software/firmware stored in computer-readable media.

According to some examples, circuitry 302 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 302 may also include one or more application-specific integrated circuits (ASICs) and component 310 may be implemented as hardware elements of these ASICs.

According to some examples, apparatus 300 may include an adaptive write acknowledgment (AWA) manager 310. In some embodiments, AWA manager 310 includes logic and/or features executed by circuitry 3020 to receive one or more write settings requests 304 and one or more write transaction requests 210 from an application executing at a host computing device coupled with the storage device that includes apparatus 400.

When circuitry 302 successfully completes one or more write settings requests 304 and one or more write transaction requests 210, circuitry 302 returns acknowledgments (ACKCs) 306 to the requesting application according to the AWA approach described herein.

Figure 4:
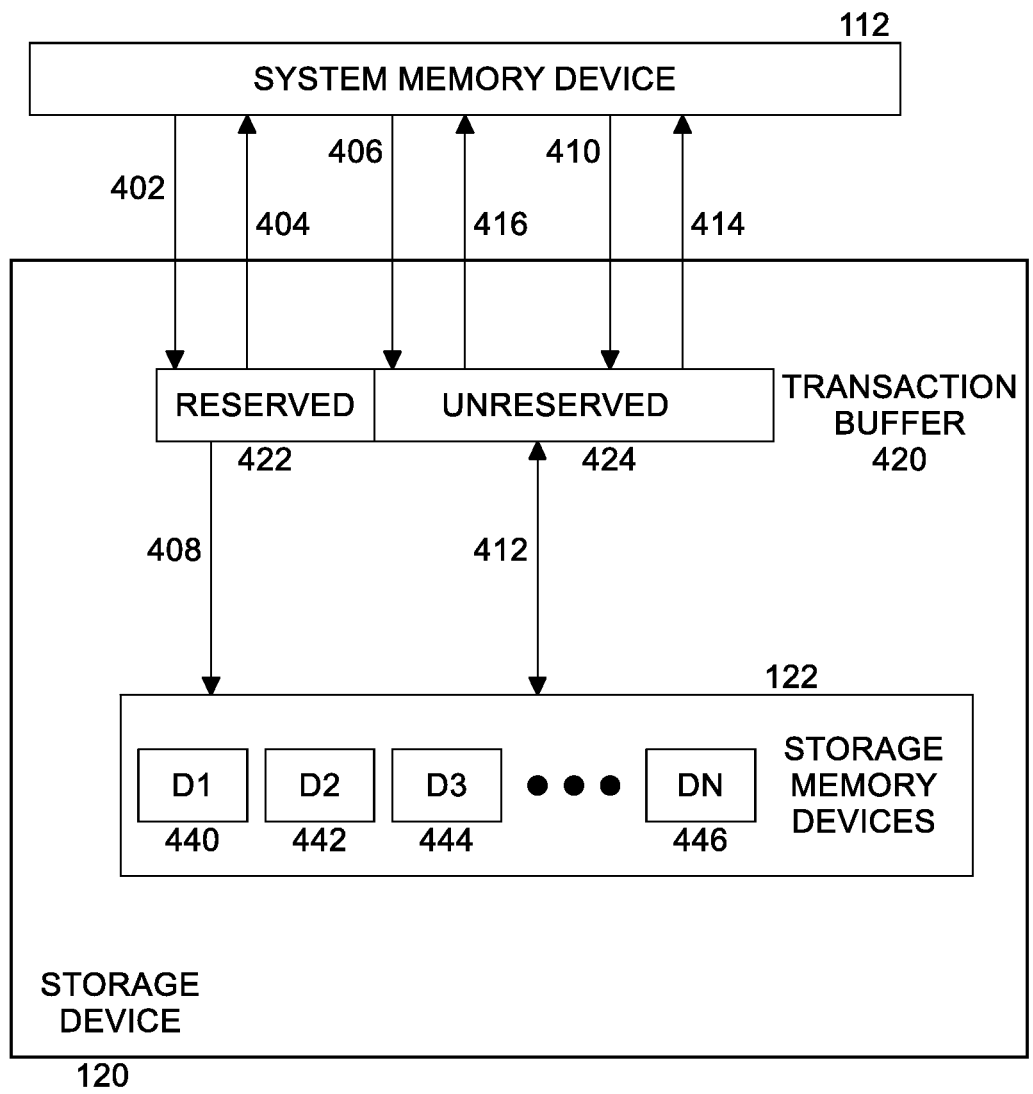
FIG. 4 illustrates a block diagram for another apparatus for adaptive write acknowledgment according to some embodiments.

FIG. 4 illustrates a block diagram 400 for another apparatus for AWA according to some embodiments. This diagram illustrates the flow of data in an embodiment of the present invention. At arrow 402, in an example of a high priority (HP) write, application 117 or OS 111 transfers write data from system memory device 112 to storage device 120. In an embodiment, this is accomplished using a direct memory access (DMA) operation. The write data is temporarily stored in a reserved area 422 of transaction buffer 420 on storage device 120. In an embodiment, transaction buffer 420 is a part of memory 126 of storage device 120.

This allows AWA manager 310 (which may be a part of storage controller 124) to coalesce small host writes until an optimal NAND write granularity is reached. If space in reserved area 422 is unavailable, unreserved area 424 of transaction buffer 420 may be used. However, HP writes are infrequent and hence the need for additional (unreserved) space may not arise. At arrow 404, for an HP write an acknowledgment is immediately sent back to the application/OS on the host (e.g., through system memory device 112). At arrow 406, in an example of a low priority (LP) write, application 117 or OS 111 transfers write data from system memory device 112 to storage device 120. In an embodiment, this is accomplished using a direct memory access (DMA) operation. The write data is temporarily stored in an unreserved area 424 of transaction buffer 420 on storage device 120. In an embodiment, the LP writes of NAND write granularity are accumulated in the transaction buffer 420 and acknowledged as arrow 416 only after the write data is programmed into one or more NAND memory dies, such as D1 440, D2 442, D3 444, . . . DN 446, where N is a natural number), of storage memory devices 122. This allows for "back pressure" on individual host write threads.

The number of memory dies D1 440 through DN 446 engaged in program operation is controlled by specifying the number of NAND work items dispatched. In an embodiment, this may include specifying the number of memory dies currently being used. This can be set by the host (e.g., OS 111) via known NVMe admin commands or be a function of write queue depth (QD) (which can be autodetected by firmware in storage controller 124). Similarly, internal firmware writes (as controlled by storage controller 124 and/or storage memory devices 122) and garbage collection is controlled. This leads to predictable and managed rQoS.

At arrow 408, storage device 120 initiates a NAND write to transfer the write data from the HP write to one or more of the memory dies D1 . . . DN in one or more storage memory devices 122. In an embodiment, this is performed during an idle time or after timeouts. In an embodiment, this eliminates padding of the memory blocks for a HP write. At arrow 412, storage device 120 initiates a NAND write to transfer the write data for the LP write from unreserved area 424 of transaction buffer 420 to one or more of the memory dies D1 . . . DN in one or more storage memory devices 122 and sends the ACKC at arrow 416 when complete. At arrow 410, when a host read is requested, data is read at arrow 412 from one or more of the memory dies D1 . . . DN and returned at arrow 414 through unreserved area 424 of transaction buffer 420 back to the host (e.g., OS 111 using system memory device 112). The rQoS is thus managed and is predictable as the probability of read on write collisions is controlled.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 5 illustrates a logic flow 500 according to some embodiments. Logic flow 500 may be representative of some or all the operations executed by one or more logic, features, or devices described herein, such as apparatus 300. More particularly, logic flow 500 may be implemented by AWA manager 310 in storage controller 124.

Figure 5A:
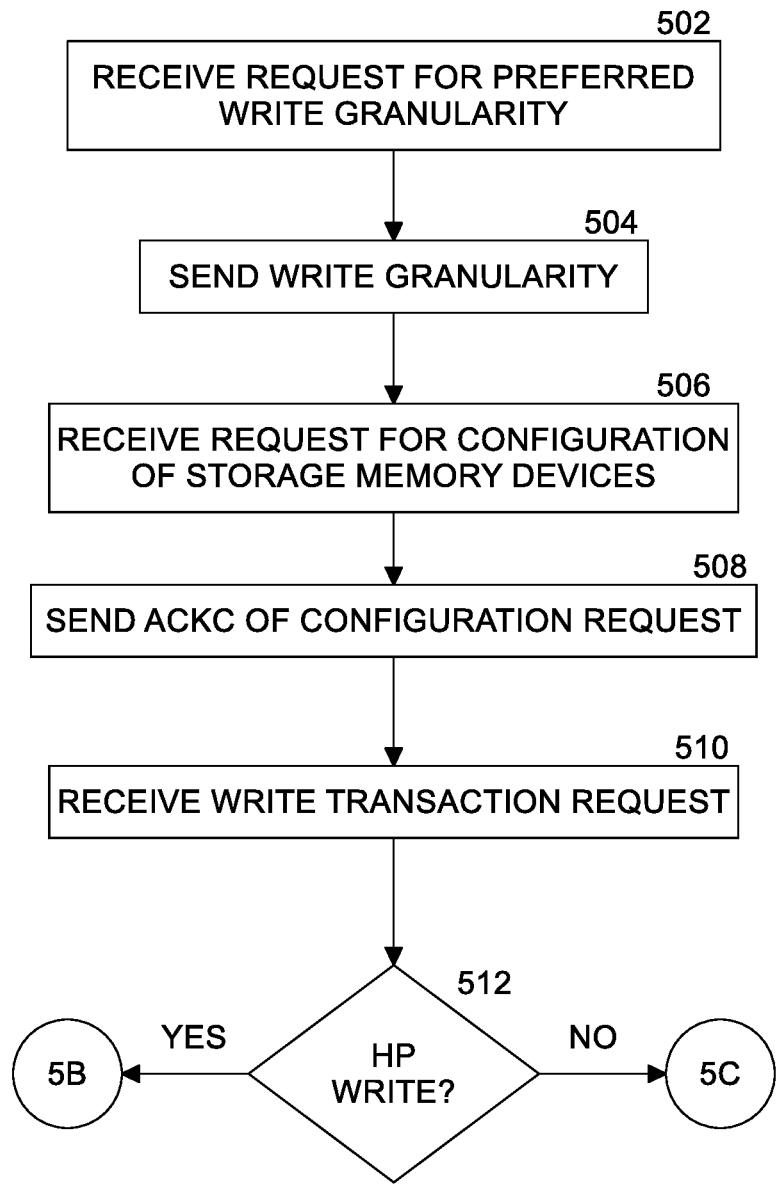
FIGS. 5A, 5B, and 5C illustrate logic flows of adaptive write acknowledgment according to some embodiments.

At block 502 of FIG. 5A, AWA manager 310 receives a request for a preferred write granularity for a write transaction for the storage device 120 from a requestor on the host (e.g., application, 117, OS 111 or storage device driver 115). This request is an example of a write settings request 304. At block 504, AWA manager 310 sends the preferred write granularity back to the host. At block 506, AWA manager 310 receives a request from the host (e.g., OS 111 or storage device driver 115) for configuration of one or more storage memory devices 122. In an embodiment, this request comprises a request to configure (e.g., set) a maximum number of memory dies (e.g., a number of memory dies D1 440 . . . DN 446) to engage for program operations for writes to storage memory devices 122 (e.g., for use in writing the write data to the storage memory devices). At block 508, AWA manager 310 configures the maximum number of dies and sends an acknowledgment back to the host. At block 510, AWA manager 310 receives a write transaction request 210. The write transaction request 210 is for either an HP write or an LP write. If the received write transaction request is for an HP write, then processing continues on FIG. 5B. if the received write transaction request is for an LP write, the processing continues on FIG. 5C.

Figure 5B:
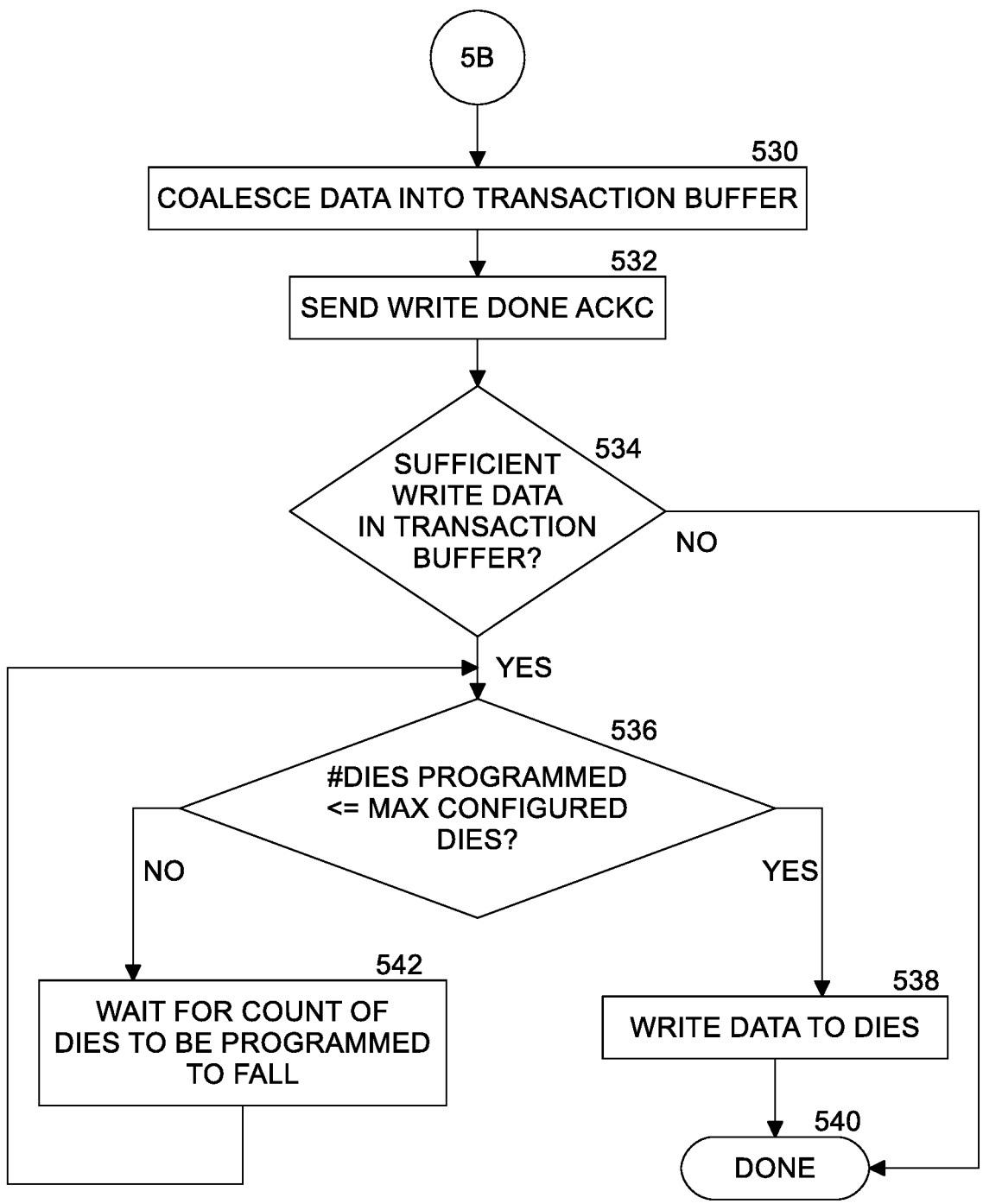

Turning to FIG. 5B, at block 530, AWA manager 310 coalesces data received in an HP write into a block in reserved area 422 of transaction buffer 420. In an embodiment, the block size is the write granularity. At block 532, AWA manager 310 sends a write done acknowledgment back to the requestor on the host. At block 534, if there is sufficient write data in the block in the reserved area of the transaction buffer (e.g., the block is full (100%) or close to full (e.g., 90% or more depending, on the implementation) to efficiently write the data to the storage memory devices), and according to the selected write granularity determined at blocks 502 and 504), processing continues with block 536. Otherwise, a write is not done at this time and processing ends at block 540. If the block is ready, at block 536 if the number of memory dies to be programmed to perform the HP write is less than or equal to the maximum number of memory dies to be used (as configured at blocks 506 and 508), then the HP data is written to one or more memory dies according to the block based at least in part on the write granularity at block 538, and processing ends at block 540. At this time, the incoming host reads have a deterministic collision probability with the ongoing NAND memory die program operation. Otherwise, if the number of memory dies to be programmed to perform the HP write is not less than or equal to the maximum number of memory dies to be used (as configured at blocks 506 and 508), AWA manager 310 waits for a count of the memory dies to be programmed to decrease such that the count falls below the threshold at block 542 (e.g., the number of memory dies to be programmed becomes less than or equal to the maximum number of memory dies to be used). Processing continues with block 536.

Figure 5C:
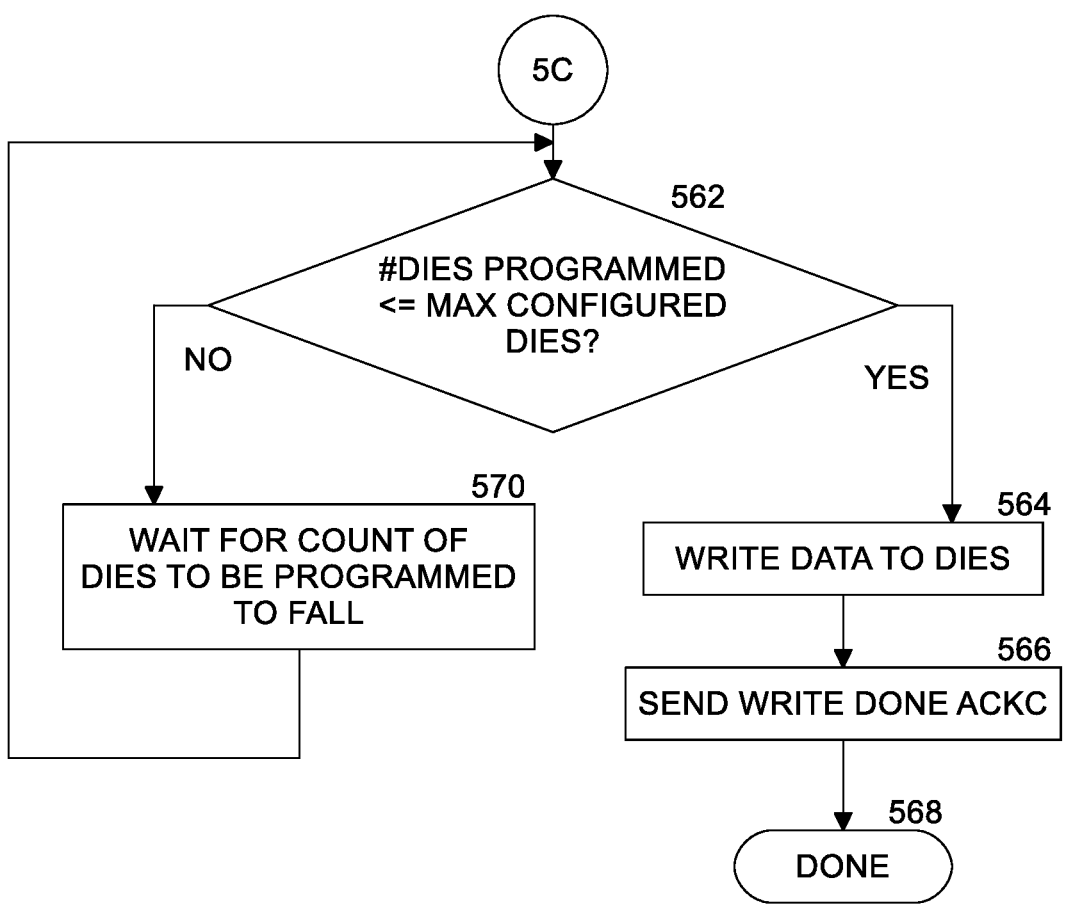

Turning to FIG. 5C, at block 536 if the number of memory dies to be programmed to perform the LP write is less than or equal to the maximum number of memory dies to be used (as configured at blocks 506 and 508), then the LP data is written to one or more memory dies at block 564, AWA manager 310 sends a write done acknowledgment back to the requestor on the host at block 566, and processing ends at block 568. At this time, the incoming host reads have a deterministic collision probability with the ongoing NAND memory die program operation. Otherwise, if the number of memory dies to be programmed to perform the LP write is not less than or equal to the maximum number of memory dies to be used (as configured at blocks 506 and 508), AWA manager 310 waits for a count of the memory dies to be programmed to fall below the threshold at block 570. Processing continues with block 562.

Figure 6:
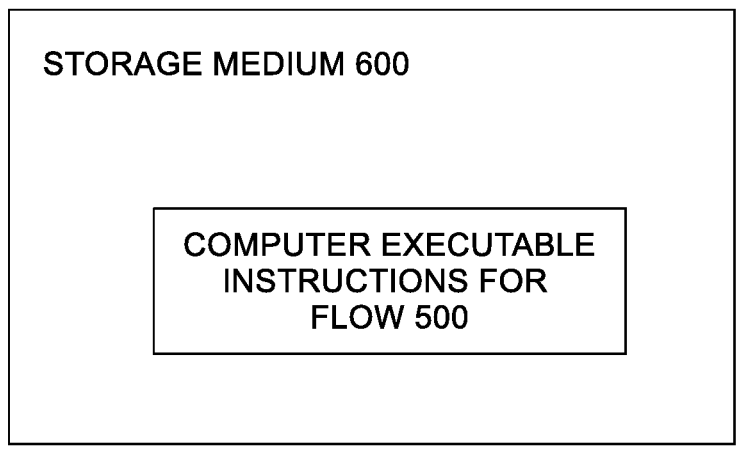
FIG. 6 illustrates an example storage medium.

FIG. 6 illustrates an example of a storage medium 600. Storage medium 800 may comprise a tangible non-transitory article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
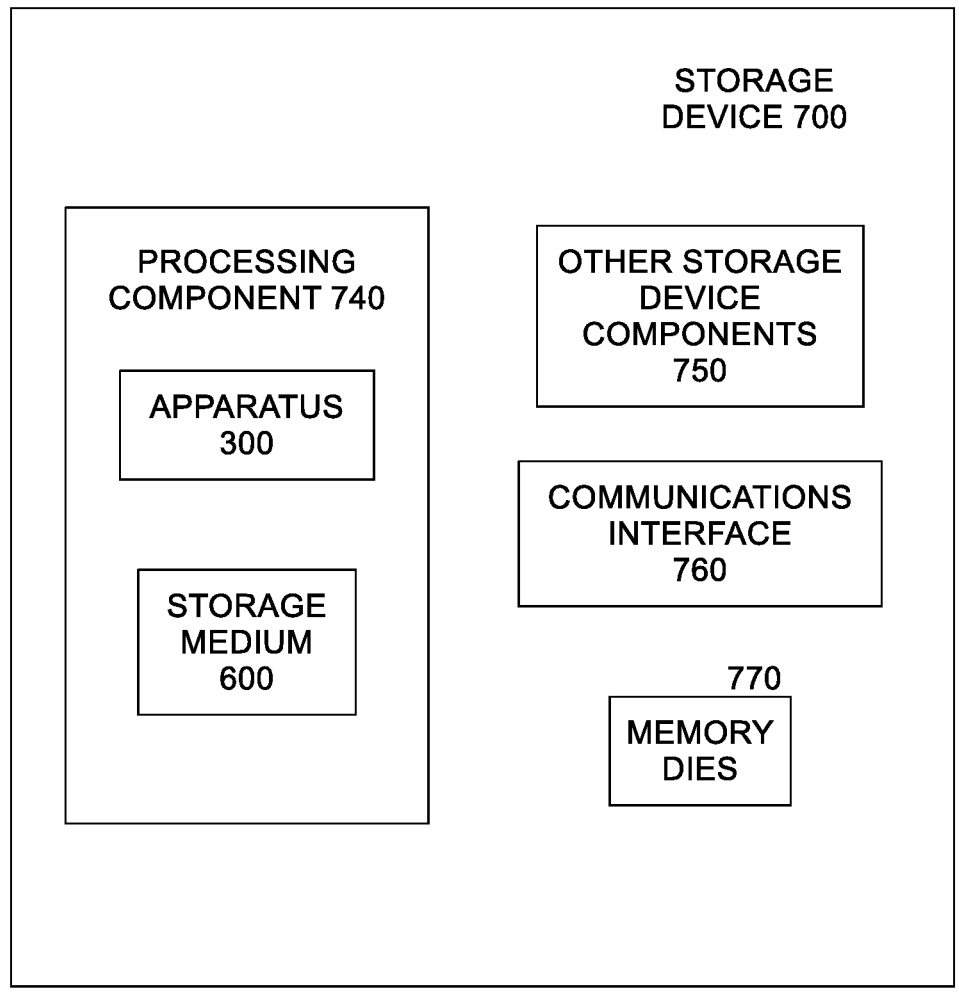
FIG. 7 illustrates an example storage device.

FIG. 7 illustrates an example storage device 700. In some examples, as shown in FIG. 7, storage device 700 may include a processing component 740, other storage device components 750, a plurality of memory dies 770 and a communications interface 760. According to some examples, storage device 700 may be capable of being coupled to a host computing device or platform.

According to some examples, processing component 740 may execute processing operations or logic for apparatus 300 and/or storage medium 600. Processing component 740 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASIC, programmable logic devices (PLD), digital signal processors (DSP), FPGA/programmable logic, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other storage device components 750 may include common computing elements or circuitry, such as one or more processors, multi-core processors, co-processors, memory units, chipsets, controllers, interfaces, oscillators, timing devices, power supplies, and so forth. Examples of memory units may include without limitation various types of computer readable and/or machine readable storage media in the form of one or more higher speed memory units, such as read-only memory (ROM), RAM, DRAM, DDR DRAM, synchronous DRAM (SDRAM), DDR SDRAM, SRAM, programmable ROM (PROM), EPROM, EEPROM, flash memory, ferroelectric memory, SONOS memory, polymer memory such as ferroelectric polymer memory, nanowire, FeTRAM or FeRAM, ovonic memory, phase change memory, memristers, STT-MRAM, magnetic or optical cards, 3D XPoint™, and any other type of storage media suitable for storing information. Memory units may include memory dies 770.

In some examples, communications interface 760 may include logic and/or features to support a communication interface. For these examples, communications interface 760 may include one or more communication interfaces that operate according to various communication protocols or standards to communicate over direct or network communication links. Direct communications may occur via use of communication protocols such as SMBus, PCIe, NVMe, QPI, SATA, SAS or USB communication protocols. Network communications may occur via use of communication protocols Ethernet, Infiniband, SATA or SAS communication protocols.

Storage device 700 may be arranged as an SSD or an HDD that may be configured as described above for storage device 120 of system 100 as shown in FIG. 1. Accordingly, functions and/or specific configurations of storage device 700 described herein, may be included or omitted in various embodiments of storage device 700, as suitably desired.

The components and features of storage device 700 may be implemented using any combination of discrete circuitry, ASICs, logic gates and/or single chip architectures. Further, the features of storage device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example storage device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 8:
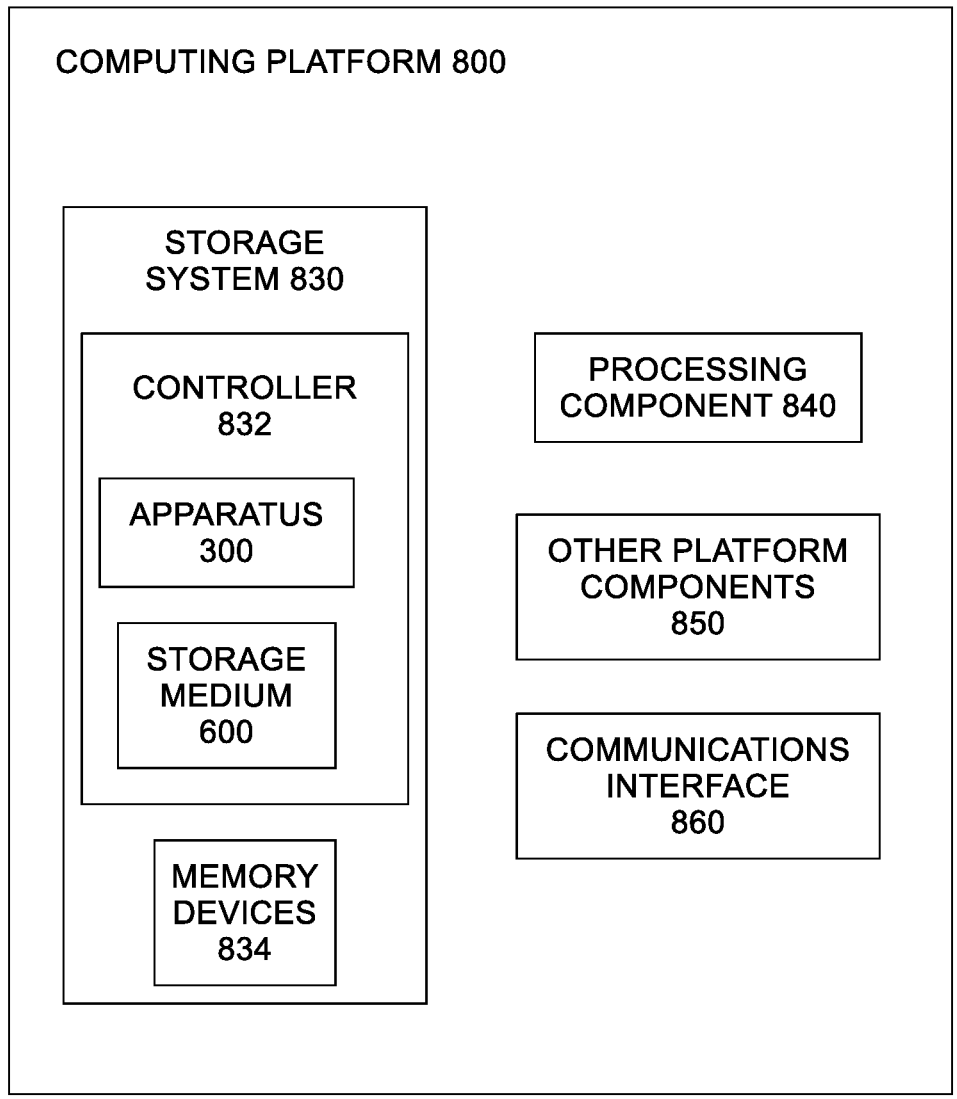
FIG. 8 illustrates an example computing platform.

FIG. 8 illustrates an example computing platform 800. In some examples, as shown in FIG. 8, computing platform 800 may include a storage system 830, a processing component 840, other platform components 850 and a communications interface 860. According to some examples, computing platform 800 may be implemented in a computing device.

According to some examples, storage system 830 may be similar to storage device 120 of system 100 as shown in FIG. 1 and storage device 700 as shown in FIG. 7 and includes a controller 832 and memory devices 834. For these examples, logic and/or features resident at or located at controller 832 may execute at least some processing operations or logic for apparatus 300 and may include storage media that includes storage medium 600. Also, memory devices 834 may include similar types of volatile or non-volatile memory (not shown) that are described above for storage device 120.

According to some examples, processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASIC, PLD, DSP, FPGA/programmable logic, memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements, such as one or more processors, multi-core processors, co-processors, memory units, chipsets, controllers, peripherals, interfaces, oscillators, timing devices, video cards, audio cards, multimedia I/O components (e.g., digital displays), power supplies, and so forth. Examples of memory units associated with either other platform components 1050 or storage system 1030 may include without limitation, various types of computer readable and machine readable storage media in the form of one or more higher speed memory units, such as ROM, RAM, DRAM, DDRAM, SDRAM, SRAM, PROM, EPROM, EEPROM, flash memory, ferroelectric memory, SONOS memory, polymer memory such as ferroelectric polymer memory, nanowire, FeTRAM or FeRAM, ovonic memory, nanowire, EEPROM, phase change memory, memristers, STT-MRAM, 3D XPoint™, magnetic or optical cards, an array of devices such as RAID drives, solid state memory devices, SSDs, HDDs or any other type of storage media suitable for storing information.

In some examples, communications interface 860 may include logic and/or features to support a communication interface. For these examples, communications interface

860 may include one or more communication interfaces that operate according to various communication protocols or standards to communicate over direct or network communication links. Direct communications may occur through a direct interface via use of communication protocols or standards described in one or more industry standards (including progenies and variants) such as those associated with the SMBus specification, the PCIe specification, the NVMe specification, the SATA specification, SAS specification or the USB specification. Network communications may occur through a network interface via use of communication protocols or standards such as those described in one or more Ethernet standards promulgated by the IEEE. For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3").

Computing platform 800 may be part of a computing device that may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 800 described herein, may be included or omitted in various embodiments of computing platform 800, as suitably desired.

The components and features of computing platform 800 may be implemented using any combination of discrete circuitry, ASICs, logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic", "circuit" or "circuitry."

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving, at a storage controller for a storage device, a write transaction request from a requestor to write data to one or more memory devices in the storage device;
    when the write transaction request is for a high priority (HP) write,
        coalescing the write data into a transaction buffer in a memory of the storage device, and
        sending an acknowledgment for the write transaction request to the requestor before writing the write data into the one or more memory devices; and
    when the write transaction request is for a low priority (LP) write,
        writing the write data into the one or more memory devices, and
        sending an acknowledgment for the write transaction request to the requestor.

2. The method of claim 1, comprising receiving a request from the requestor for a write granularity of the one or more memory devices, sending the write granularity to the requestor, wherein coalescing the write data into the transaction buffer comprises coalescing the write data into a block based at least in part on the write granularity, and writing the block into the one or more memory devices.

3. The method of claim 2, comprising receiving a request from the requestor to set a maximum number of memory dies of the one or more memory devices for use in writing the write data, configuring the maximum number of memory dies, and sending an acknowledgment to the requestor.

4. The method of claim 3, comprising when a number of memory dies to be programmed to perform writing the write data is not less than or equal to the maximum number of memory dies, waiting for a count of the memory dies to be programmed to be less than or equal to the maximum number of memory dies before writing the write data.

5. The method of claim 1, wherein coalescing the write data into a transaction buffer in a memory of the storage device comprises coalescing the write data into an area of the transaction buffer reserved for HP writes.

6. The method of claim 1, comprising storing the write data into an unreserved area of the transaction buffer used for LP writes and data reads.

7. The method of claim 1, wherein a frequency of HP writes is less than a frequency of LP writes.

8. At least one non-transitory machine-readable medium comprising a plurality of instructions that in response to being executed by a system at a computing platform cause the system to:
    receive, at a storage controller for a storage device, a write transaction request from a requestor to write data to one or more memory devices in the storage device;
    when the write transaction request is for a high priority (HP) write,
        coalesce the write data into a transaction buffer in a memory of the storage device, and
        send an acknowledgment for the write transaction request to the requestor before, write the write data into the one or more memory devices; and
    when the write transaction request is for a low priority (LP) write,
        write the write data into the one or more memory devices, and
        send an acknowledgment for the write transaction request to the requestor.

9. The at least one non-transitory machine-readable medium of claim 8, comprising a plurality of instructions that in response to being executed by a system at a computing platform cause the system to:
    receive a request from the requestor for a write granularity of the one or more memory devices, send the write granularity to the requestor, wherein instructions to coalesce the write data into the transaction buffer comprise instructions to coalesce the write data into a block based at least in part on the write granularity, and instructions to write the block into the one or more memory devices.

10. The at least one non-transitory machine-readable medium of claim 9, comprising a plurality of instructions that in response to being executed by a system at a computing platform cause the system to:
    receive a request from the requestor to set a maximum number of memory dies of the one or more memory devices for use in writing the write data, configure the maximum number of memory dies and send an acknowledgment to the requestor.

11. The at least one non-transitory machine-readable medium of claim 10, comprising a plurality of instructions that in response to being executed by a system at a computing platform cause the system to:
    when a number of memory dies to be programmed to perform writing the write data is not less than or equal to the maximum number of memory dies, wait for a count of the memory dies to be programmed to be less than or equal to the maximum number of memory dies before writing the write data.

12. The at least one non-transitory machine-readable medium of claim 8, wherein instructions to coalesce the write data into a transaction buffer in a memory of the storage device comprise instructions to coalesce the write data into an area of the transaction buffer reserved for HP writes.

13. The at least one non-transitory machine-readable medium of claim 8, comprising instructions to store the write data into an unreserved area of the transaction buffer used for LP writes and data reads.

14. A storage device comprising:
    a memory;
    one or more storage memory devices; and
    a storage controller, the storage controller including an adaptive write acknowledgment manger to receive a write transaction request from a requestor to write data to the one or more memory devices;

when the write transaction request is for a high priority (HP) write,
- coalesce the write data into a transaction buffer in the memory, and
- send an acknowledgment for the write transaction request to the requestor before writing the write data into the one or more memory devices; and when the write transaction request is for a low priority (LP) write,
- write the write data into the one or more memory devices, and
- send an acknowledgment for the write transaction request to the requestor.

15. The storage device of claim 14, comprising the adaptive write acknowledgment manager to:
receive a request from the requestor for a write granularity of the one or more memory devices, send the write granularity to the requestor, coalesce the write data into a block based at least in part on the write granularity, and write the block into the one or more memory devices.

16. The storage device of claim 15, comprising the adaptive write acknowledgment manager to:
receive a request from the requestor to set a maximum number of memory dies of the one or more memory devices for use in writing the write data, configure the maximum number of memory dies and send an acknowledgment to the requestor.

17. The storage device of claim 16, comprising the adaptive write acknowledgment manager to:
when a number of memory dies to be programmed to perform writing the write data is not less than or equal to the maximum number of memory dies, wait for a count of the memory dies to be programmed to be less than or equal to the maximum number of memory dies before writing the write data.

18. The storage device of claim 14, wherein the adaptive write acknowledgment manager to coalesce the write data into a transaction buffer in a memory of the storage device comprises the adaptive write acknowledgment manager to coalesce the write data into an area of the transaction buffer reserved for HP writes.

19. The storage device of claim 14, comprising the adaptive write acknowledgment manager to store the write data into an unreserved area of the transaction buffer used for LP writes and data reads.

20. The storage device of claim 14, wherein a frequency of HP writes is less than a frequency of LP writes.

* * * * *